(12) United States Patent
Mumm et al.

(10) Patent No.: US 8,161,291 B2
(45) Date of Patent: Apr. 17, 2012

(54) PROCESS AND ARRANGEMENT FOR AUTHENTICATING A USER OF FACILITIES, A SERVICE, A DATABASE OR A DATA NETWORK

(75) Inventors: Marc Mumm, Munich (DE); Rajasekharan Kuppuswamy, Munich (DE)

(73) Assignee: VoiceCash IP GmbH, Munich (DE)

( * ) Notice: Subject to any disclaimer, the term of this patent is extended or adjusted under 35 U.S.C. 154(b) by 965 days.

(21) Appl. No.: 11/969,998

(22) Filed: Jan. 7, 2008

(65) Prior Publication Data

US 2009/0025071 A1      Jan. 22, 2009

(30) Foreign Application Priority Data

Jul. 19, 2007   (DE) .......................... 10 2007 033 812

(51) Int. Cl.
*G06F 21/00* (2006.01)
(52) U.S. Cl. ...................................... 713/186; 713/185
(58) Field of Classification Search ................... 713/185, 713/186
See application file for complete search history.

(56) References Cited

U.S. PATENT DOCUMENTS

| | | | |
|---|---|---|---|
| 2002/0010857 A1* | 1/2002 | Karthik ........................ 713/168 |
| 2003/0051138 A1 | 3/2003 | Maeda et al. |
| 2003/0163739 A1 | 8/2003 | Armington et al. |
| 2005/0165700 A1 | 7/2005 | Karthik |
| 2006/0034287 A1 | 2/2006 | Novack et al. |
| 2006/0156385 A1 | 7/2006 | Chiviendacz et al. |
| 2006/0239512 A1 | 10/2006 | Petrillo |
| 2007/0061590 A1* | 3/2007 | Boye et al. .................... 713/186 |

FOREIGN PATENT DOCUMENTS

| | | |
|---|---|---|
| EP | 1675070 | 6/2006 |
| EP | 1843325 | 10/2007 |
| EP | 1860647 | 11/2007 |
| WO | 2004015552 | 2/2004 |

* cited by examiner

*Primary Examiner* — Edward Zee
(74) *Attorney, Agent, or Firm* — Volpe and Koenig, P.C.

(57) ABSTRACT

A process for authenticating a user to control remote access to a service, data base or data network is provided, in which during an enrollment step, an initial voice sample provided by the user is analyzed to obtain an initial user-specific voice profile and, in a later verification step, a current voice sample of the user is analyzed and compared to the initial voice profile to generate an access control signal. An additional user-dedicated authentication is generated in a pre-enrollment period, and the additional authentication is used to authenticate the user in the enrollment step and/or in an access control step prior to and independent on the enrollment step, in a provisional or supplementary authentication procedure.

14 Claims, 6 Drawing Sheets

Enrollment

| | |
|---|---|
| System: | "Welcome to Virtual Voice Password Reset Service. To get started, please enter your User-ID." |
| Caller: | "1-2-3-4-5-6-7" |
| System: | "Next, please enter your VT-Code." |
| Caller: | "1-2-3" |
| System: | "Next please enter your values from your secret table" A1 |
| Caller: | 14 |
| System: | B5 |
| Caller: | 56 |
| System: | C4 |
| Caller: | 56 |
| System: | D2 |
| Caller: | 69 |
| System: | E5 |
| Caller: | 45 |
| System: | "Okay, to enroll you in the system, I'll ask for some information that I'll use to learn your voice and create your unique voiceprint. Then every time you call back I'll be able to verify your identity using your voice." |
| System: | "Next, for security reasons please enter your PIN" |
| Caller: | "*_*_*_*" |
| System: | "Next, please count from zero to nine like this: '0-1-2-3-4-5-6-7-8-9'. Please start counting now." |
| Caller: | "0-1-2-3-4-5-6-7-8-9" |
| System: | "The last step is to have you practice repeating some random digits, since this is how your voice will be verified when you call back. Here we go. Please say these four random digits, : zero two three four" |
| Caller: | "0-2-3-4" |
| System: | Please repeat "zero two three four" |
| Caller: | "0-2-3-4" |
| System: | "Okay, you've been successfully enrolled in the system. Press any key to reset your password?" |
| Caller: | "*" |
| System: | "Please note, it may take up to 15 minutes before you can log in with your new password. " |
| System: | "Your new password is cookie ninety-one, spelled C-O-O-K-I-E nine one. Please press any key to hear it again?" |
| Caller: | "no_input" |
| System: | "Thanks for calling. Goodbye!" |

Fig. 3

Verification

| | |
|---|---|
| System: | Welcome to Virtual Voice Password Reset Service. To get started, please enter your User-ID." |
| Caller: | "1-2-3-4-5-6-7" |
| System: | "Next, please enter your VT-Code." |
| Caller: | "1-2-3" |
| System: | "Next please enter your values from your secret table" A1 |
| Caller: | 14 |
| System: | B5 |
| Caller: | 56 |
| System: | C4 |
| Caller: | 56 |
| System: | D2 |
| Caller: | 69 |
| System: | E5 |
| Caller: | 45 |
| System: | "Next, you'll need to repeat some random digits. Here we go. Please say: nine six seven four." |
| Caller: | "9-6-7-4" |
| System: | Please repeat "nine six seven four." |
| Caller: | "9-6-7-4" |
| System: | "Your identity has been verified. Now, Press any key to reset your password?" |
| Caller: | "*." |
| System: | "Please note it may take up to 15 minutes before you can log in with your new password. " |
| System: | "Your new password is cookie ninety-one, spelled C-O-O-K-I-E nine one. Please press any key to hear it again?" |
| Caller: | "No_input" |
| System: | "Thanks for calling. Goodbye!" |

Login

User Name [ ]
Password [ ]
System Name [Authentication ▶]
[Login]

Registration PIN: XXXX

Please answer the following questions. The answers will be used to authenticate you in your next call Date of Birth: XXXX Place
1. XXX        2. XXX
3. XXX        4. XXX Name
1. XXX        2. XXX
3. XXX        4. XXX

XXX
1. XXX        2. XXX
3. XXX        4. XXX

You have successfully finished the first part of your registration

To use the Password Reset system later-on just call the usual help desk number. You will be asked to provide the answers to your secret questions by DTMF and voice.

After the voice enrollment is completed you can reset your password.

Important:
The Password Reset call can be made anytime you are in need of a new password, it doesn't have to be done immediately.

PROCESS AND ARRANGEMENT FOR AUTHENTICATING A USER OF FACILITIES, A SERVICE, A DATABASE OR A DATA NETWORK

BACKGROUND

This invention refers to a process and arrangement for authenticating a user of facilities, a service, a database or a data network.

In conventional access control systems, as applied to data networks, identification or authentication means, respectively, of the knowledge-based type are being used to fulfil the security requirements. In particular, for decades password-based or PIN based identification/authentication schemes are known and generally used. More specifically, in spy- or fraud-sensitive applications, such as home banking applications, supplementary security measures like the provision and obligatory use of individual transaction codes or TANs, respectively, are known and widely used. Even such supplementary security-enhancing schemes are knowledge based and suffer, therefore, from the typical disadvantages of all knowledge based schemes, i.e. problems related to the loss of the relevant information by the authorized user on one hand and risk arising from the access to such information by an unauthorized user on the other hand.

Therefore, in recent years considerable efforts have been made to include other types of identification/authentication schemes into the security mechanisms of data networks. In particular, approaches to add "possession-based" (tokens) and/or "being-based" (biometry-based) schemes to the well-known knowledge-based schemes, or even to substitute the latter schemes with such new ones, have been tried. For example, in automatic cash dispensers, biometrical authentication schemes based on fingerprint or retina recognition, respectively, have been proposed for controlling the access to bank accounts. Furthermore, the meanwhile well-established fingerprint-based access control means of notebooks and other personal computers should be mentioned as some kind of means for controlling the access to data networks.

More recently, voice-based authentication solutions, as a specific type of biometry-based identifications/authentications, have widely been introduced by firms to supplement their internal knowledge-based access control schemes.

In internet and mobile based services and activities, in particular in internet market places like ebay or internet financial transaction systems like PayPal, with the rapidly growing worldwide user base the number of fraudulent attacks increases significantly. The probability of a successful attack on accounts of a worldwide internet-based service with millions of users is much higher than with phishing attacks on local banks.

Thus, voice-based authentication is also being discussed as a security scheme for internet and mobile network based services and data access systems.

Facing this type of sophisticated application on a huge scale, voice biometric solutions have to cope with several technological challenges and to achieve a high level of user acceptance. Specific challenges are linked to the enrolment procedure, cross-channel problems, security requirements, flexibility and scalability demands.

For the enrolment process, a unique user ID is required to identify the user. However, there is no universal form of user IDs to identify users of voice biometric systems. The formatting varies from company to company. In the enterprise market the personal number of the employees is often used for identification, whereas in the consumer market the name of a person or any other substitute to the name (login name, e-mail address, mobile number) are used or can be used to identify the user, at least with a certain degree of reliability.

Today, for this step, automatic speech recognition (ASR) is used. However, basically the integration of ASR in a voice verification solution is limiting its scalability. ASR solutions are not available in all languages or suffer from several problems in a number of languages. This means: Although a voice verification solution could, in principle, be offered to customers in these specific countries, the solution as it is offered now (including a speech recognition and a voice verification part) cannot be provided to customers in these countries due to the missing or sub-optimal ASR component.

The elimination of the ASR component would make the system easier to use and easier to scale, but until now there is no solution to avoid the integration of the speech recognition component into a voice profile based authentication system.

Furthermore, security is a big issue for customers. Until now, most voice biometric security solutions exclusively rely on voice authentication as the only real security layer besides the user ID (checked with voice recognition). However, this means that the threshold of the voice authentication security layer had to be set high to ensure a high resulting level of security. This can result in limitations during the usage of the system.

The usage of different types of phones (fixed line (wired), fixed line (DECT), mobile phone, VoIP) results in problems in the usage of voice biometric solutions. As the bandwidth of the different telephony channels is ranging from 8 kbit/s (VoIP) to 64 kbit/s (ISDN) and even much more, the quality of the voice sample differs. A user enrolled with a VoIP phone can have problems with verification on a wired fixed line phone, as the voice sample provided on the fixed line phone differs from the voice sample provided during enrolment on the VoIP phone. A solution for this problem would be to decrease the threshold which determines the sensitivity of the system.

Combined with the security requirements, the cross-channel problems may lead to an inconvenience factor in the usage of voice authentication products, related to higher false rejection rates (FRR) and problems during enrolment and usage of the solution.

As already mentioned above, to use a voice biometric system each user has to register in the system, storing his/her voiceprint in the database. Only after the user has enrolled in the system he/she can use the system. A problem linked with the enrolment process is that most voice biometric systems try to achieve a 100% enrolment level of the users in the start period of the system implementation. This results in a high load on the voice channels in the first weeks/months after the installation. A higher number of voice channels are needed to handle the high number of enrolling users. If a system is only used with the number of voice ports, which are needed to guarantee a convenient daily usage after the enrolment phase, some of the users, which want to enrol, may not be served as the voice ports are blocked.

SUMMARY

It is an object of the invention to provide an improved process and apparatus for controlling the access of a user to a service provided in a data network which is, in particular, relatively easy to implement and to use, as well as acceptable under cost aspects.

This object is, under process aspects, solved by a process according to the invention and, under device aspects, by an arrangement according to the invention. Preferred embodiments of the invention are subject of dependent claims.

The invention intends to improve a process for authenticating a user, to control his remote access to a service, data base or data network, wherein, in an enrolment step, an initial voice sample provided by the user is analyzed to obtain an initial user-specific voice profile and, in a later verification step, a current voice sample provided by the user is analyzed to obtain a current voice profile which is compared to the initial voice profile to generate an access control signal in response to the result of the comparison step. The improvement includes the idea to provide additional user-dedicated authenticating means which are generated in a pre-enrolment period, the additional authenticating means being used to authenticate the user in the enrolment step and/or in an access control step prior to and independent on the enrolment step, in a provisional or supplementary authentication procedure.

Correspondingly, under apparatus aspects the invention intends to improve an arrangement for carrying out this process and for this purpose comprising an authentication server in so far as the authentication server comprises voice profile generation means, voice profile storing means and voice profile comparing means for obtaining a first authentication output based on voice sample input by the user and user data processing means, user data storing means and user data comparing means for obtaining a second authentication output from data input by the user and access control signal generation means to generate an access control signal in response to the first and second authentication outputs.

A key difference with regard to existing voice biometric solutions is that the proposed $2^{nd}$ factor authentication procedure does not rely on voice biometrics as the only security layer, but combines in one security solution an additional out-of-band security layer with the voice authentication.

This makes it possible to accept a decrease in the threshold of the voice verification part, as the integration of the $2^{nd}$ security layer can compensate for such decrease in the FRR of the voice authentication and even raise the level of security. The relevant information (or hardware authentication means) of the $2^{nd}$ layer is linked to a single user. Therefore it can only be used by this specific user. In the case of loss of a hardware component (ID card), no other user can access the system, as the voice authentication-security level is still present. A new card can be issued and used without any problems, as the enrolled voice sample remains the same and only the second security layer has to be replaced. No repeated enrolment is necessary and the user can use the system immediately after getting the new card.

The ultimate goal of a voice biometric system should not be a 100% enrolment level, but a 100% automation level. Users do only enroll in the system once they are in need of a service. The enrolment and the provision of the service providing will be preferably included in one single process. This results in a lower load on the voice channels as the number of users, enrolling in the system basically at the same time may be reduced dramatically. The so-called "On-Demand-Enrolment" solves many existing problems: The users do not have to enrol in the system within a given time frame. The number of ports does not have to be extended only to serve the higher number of enrolling users, and the enrolment and first services procedures may be combined in one single process, thus increasing the user acceptance.

BRIEF DESCRIPTION OF THE DRAWINGS

Further advantages and aspects of the invention result from the following description of preferred embodiments with reference to the figures. Of these:

FIG. 3 shows an exemplary enrolment procedure on the basis of the user ID card of FIG. 2, FIG. 4 shows an exemplary verification procedure, on the basis of the user ID card of FIG. 2, FIG. 5 shows an enrolment procedure according to a second embodiment of the invention.

DETAILED DESCRIPTION OF THE PREFERRED EMBODIMENTS

Figure 1:
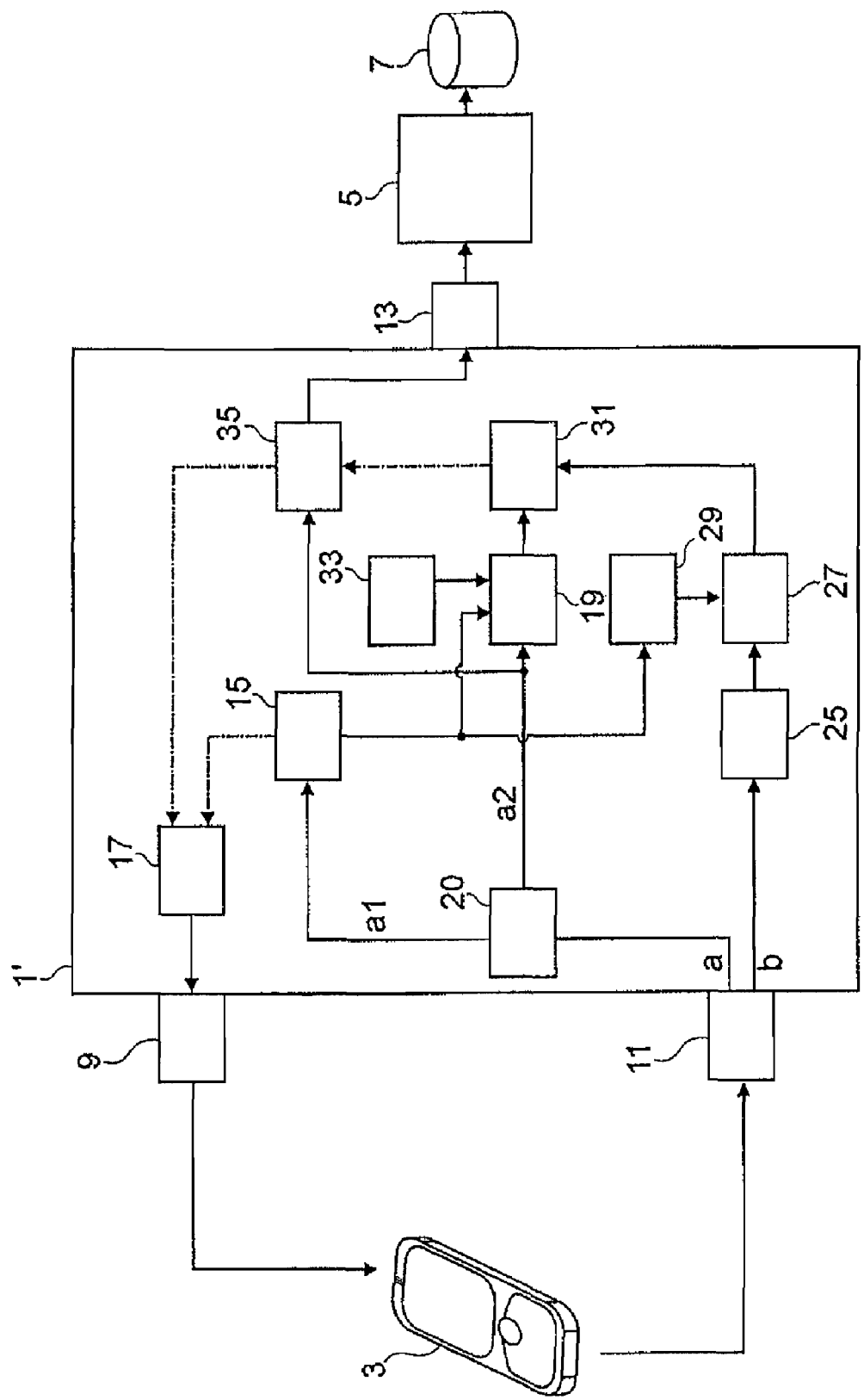
FIG. 1 shows a schematic depiction of a first example of the arrangement according to the invention as a functional block diagram.

FIG. 1 schematically shows the structure of an embodiment of the arrangement according to the invention, with a system server 1 (which, verbally illustrating its main function, can also be referred to as an authentication server) as a linking element between a mobile phone 3 of a user and a data management server 5 of a database 7. The data management server 5 is not specified any further below; here, it generally stands for any kind of functionality with which access to data or services managed internally in the system can be enabled for the user of a mobile phone. With regard to the signal connections shown, the illustration is based on the assumption that the system server is in the authentication mode.

The system server 1 has a user prompting output interface 9, a user input interface 11 (which simultaneously acts as a voice sample input interface) for temporary connection to the mobile phone 3 of the user, and a control signal output interface 13 for connection to the data management server 5 for the output of control signals to it.

According to the functional structure (shown in a simplified form in the figure for improved clarity) of the system server 1, the user input interface 11 is simultaneously designed as an input signal branch which permits feeding of input signals (for example the MSISDN) transmitted automatically by the mobile phone 3 to subsequent processing units over a first signal path a and of voice inputs of the user to subsequent components via a second signal path b. In the first signal path a digital input classification stage 20 is provided to route records generated automatically in the mobile phone along a first partial signal path a1 to a mobile number recognition stage 15, while data entered digitally by the user is routed over a second partial signal path a2 to a user data processing stage 19 and in parallel to a user input switch-through stage 35.

The mobile number recognition unit 15 issues a control signal to a user prompting unit 17 in response to acquisition of the user's mobile phone number. This unit 17 realises all user prompting during enrolment or authentication processes executed with the system presented and outputs corresponding elements of user prompting through the user prompting output interface 9. The acquired MSISDN is supplied by the mobile number recognition unit 15 to a user data processing stage 19 which, in total, is designed for input-end processing of all manner of user data. There, the data is initially buffered for later processing.

In response to the output of a user prompt providing guidance through the further procedure by the user prompting unit 17 (with details described further below), the user will speak some voice sample. The voice samples are routed via the signal path b to a voice profile computing unit 25, to obtain a current voice profile of the user.

A voice profile successfully computed by the voice profile computing unit 25 is routed to a voice profile comparison unit 27, where it is subjected to a comparison with a previously stored voice profile of the same user, which is loaded for this purpose out of a voice profile storage unit 29. Corresponding addressing of the voice profile storage unit 29 is ensured via the output signal of the mobile number recognition unit 15, which supplies the relevant indicator for the user's identity. If conformity transpires from the comparison of the voice profiles in the comparison unit 27 to an adequate degree of reliability, this unit outputs a corresponding confirmation signal to a first input of an OR stage 31.

The user data processing stage 19 acquires relevant user information from a data stream received through the user input interface 11 and isolates relevant authentication data for authenticating the user independent on its voice profile therefrom. Stage 19 compares such data with corresponding comparison data stored in the user data storage unit 33 and can (besides other functions which have been omitted in the simplified functionality presented here) output a confirmation signal to a second input of the OR stage 31 as a result of the comparison.

Further user inputs routed via the branch 20 (for example, a required access address of a memory area, the designation of a service retrieved by the user or a recharging amount for a prepaid card) can be routed to the input of a user input switch-through stage 35. The user input switch-through stage 35 is connected via a control input to the output of the OR stage 31, which sets stage 35 to a user input switch-through state provided a positive confirmation signal is present at at least one of its inputs that identifies successful authentication of the user via his or her voice profile or via other inputs (i.e. in a substitute authentication procedure). In this case the user input present at the input end is routed into the control signal output interface 13 and ultimately leads to access enabling in the database 7 via the data management server 5 (or to the execution of a comparable operation, for example the provision of a required service or the execution of a required transaction due to transaction data stored in the database 7).

At the same time, a control signal indicating switching through of the user inputs is sent to the user prompting unit 17, which outputs corresponding confirmation information for display/output on the mobile phone 3.

One of ordinary skill in the art can derive details of the special processes for specific application scenarios easily from the description above and so an explanation of one single example as given below will suffice. It also transpires from the following description that the voice profile computation and voice recognition for the purpose of $2^{nd}$ factor authentication shown as parallel processing in a simplified form in FIG. 1 can be conditionally combined so that the acquisition of a confirmation signal for user access to the database is first attempted on the basis of his or her voice profile and a $2^{nd}$ factor procedure is only stated if this authentication attempt should fail. Naturally, in such a realization, the signal combinations between the individual processing units, the user input switch-through stage and the user prompting unit are correspondingly more complex and time-dependent.

In the following, exemplary embodiments of the enrolment and verification procedures according to the invention are described, which embodiments include the integration of an additional security layer to the voice-authentication based security layer and the elimination of an automatic speech recognition from the voice-authentication security layer.

Figure 2A:
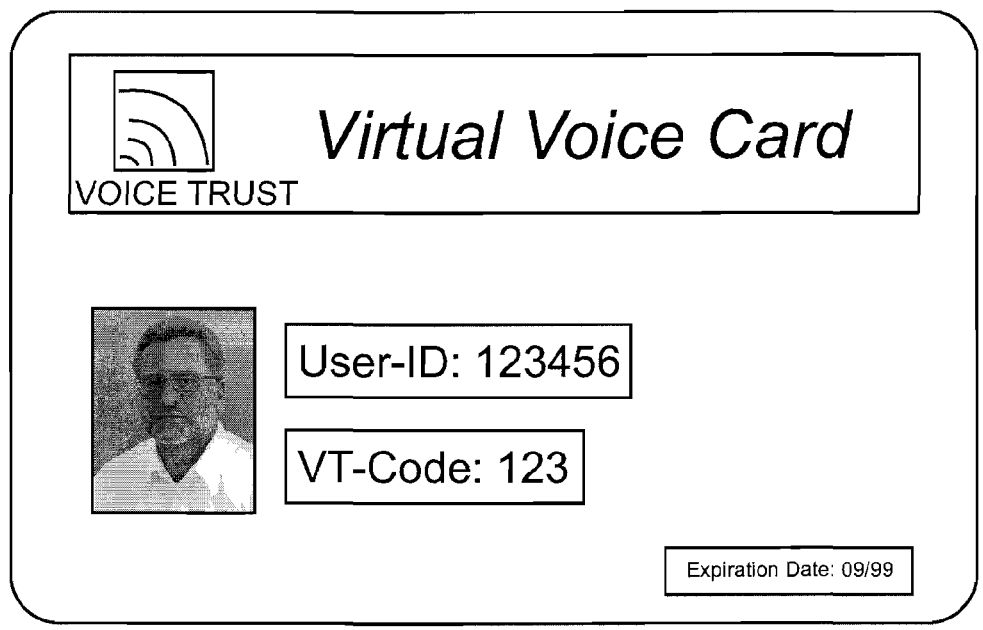
FIGS. 2A and 2B show both surfaces of a user ID card to be used in an embodiment of the present invention.
Figure 2B:
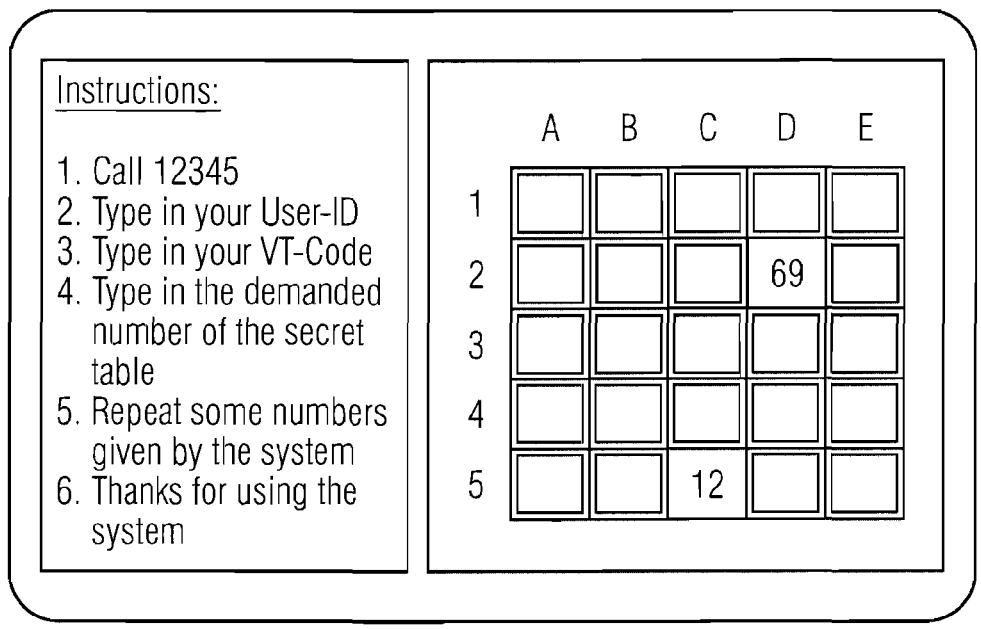

FIGS. 2A and 2B show an example of a user ID card which is adapted to the proposed process, in a first embodiment thereof and which may be understood as a hardware authentication means or "rudimental token".

Each user of the voice biometric solution will receive a physical ID card. He will only be able to activate the card using a PIN code, which will be sent to the user via a different way than the ID card and which is used later on to verify his identity during the enrolment step.

Optionally, the user can use the received PIN code to obtain his ID card online, in entering the PIN code on a specific website. After entering some credentials including the PIN Code, the user can download the Virtual Voice Card as a pdf or any non-changeable data file to his computer and print it.

As another option, the user can use the received PIN code to obtain his/her ID card via a mobile phone, in accessing a specific "mobile page" of the system provider. After entering some credentials including the PIN Code, the user can download the card as a Java Bean or any file which can be executed on a mobile phone. Afterwards, a secret table shown on the card in FIG. 2B can be executed on the mobile phone.

This ID card includes a user ID, which is linked to a person and a VT code, which is linked to the person's company to identify the user. Besides these two codes, the user ID card includes an N×N matrix with numbers uniquely linked to the owner of the card. These numbers or the secret table, respectively, are used as the second authentication layer. Optionally, the matrix numbers can be covered with a protection layer, which has to be rubbed away to use the numbers—in this case these numbers would be PINs for single, temporary use, which become invalid after one time usage.

Enrolment

1. The user calls the system for enrolment. Other than in the case of an ASR solution, where the user has to say his user ID, in the case of a user ID card based enrolment, the user has to type in his/her user ID and his/her VT code on the touchpad, using the DTMF functionality of the phone.

With the elimination of the ASR, it is ensured that a) the voice biometric solution remains flexible and scalable even to countries where ASR solutions are not available in respective languages and b) the inconvenience factor, which results from potential non-recognition of the user ID, is decreased. The user has to enter the ID on the touchpad of the phone or on the keyboard of the computer—only little misusage happens.

2. The system asks the user to enter specific numbers from the secret table on the back of the ID card which, optionally, the user has to rub away before he can see it. E.g. in the example as shown in FIG. 2B: Please enter D2→User has to read 69, Please read C5→User has to read 12. Depending on the security need, one or more challenge-response sequences are used.

3. To ensure that only the real user enrols, a PIN is provided to the user on a separate way. This PIN is used to verify the user during the enrolment.

4. In a next step, the user has to speak numbers delivered by the system. E.g., the system might ask the user to count from zero to nine or asks the user to repeat four numbers in a row twice. This procedure is based on text-independent voice authentication, as the user can enrol with other numbers than used for verification. E.g., the user enrols with a digit queue of 1-2-3-4 and verifies with a digit queue of 4-3-2-1.

5. After enough data is collected to create a speaker's voice profile, the user is successfully enrolled in the system.

Verification

1. The user calls the system for verification. The system asks the user to enter his/her user ID and the VT code on the touchpad.

2. The system asks the user to enter specific numbers from the secret table on the back of his user ID card, which optionally, the user has to rub away before he can see it. E.g. in the example above: Please enter D2→User has to read 69, Please read C5→User has to read 12. Depending on the security standard required, one or more challenge-response sequences are used.

3. In a next step, the user has to repeat (speak) numbers given by the system. Different from in the enrolment procedure, less data are required to verify the user. E.g. the system asks to repeat 4 numbers in a row twice. This procedure is based on text-independent voice verification, as the user can enrol with other numbers than used for verification.

The user won't be informed about the result of the single authentication steps. E.g. if the first authentication fails, the user still has to go through the second authentication and will only be informed about the result after two authentication steps. This ensures that potential attackers to the system will only get limited feedback about success and failure of the several authentication layers.

An alternative to the above described $2^{nd}$ factor authentication based on a token-like hardware component is the implementation of a second factor based on shared secrets. Like in the above-explained scenario the ASR is no longer needed. The enrolment and authentication process is based on DTMF and voice verification technology. The following scenario exemplifies a banking environment:

Enrolment

1. The user calls the system for using the service and enrolling in the system. For identification, the user has to type in his/her bank account number or any other use-unique identification, followed by the used PIN or any other user-unique authentication. These two factors are used for the initial identification and authentication of the user.

2. The user has to do a voice enrolment. In a challenge-response procedure the user has to answer certain challenge questions. These challenges are e.g. the user's name or shared secrets. E.g. the user has to repeat his/her name and to tell as a shared secret his/her mother's maiden name or the date/place of birth.

3. After enough data is collected to create a speaker's model, the user is successfully enrolled in the system.

4. After passing the voice enrolment step the user can immediately use the service within the same service call. E.g., the user can immediately reset a password or instruct some financial transaction etc. without having to call the system a second time.

Verification

1. The user calls the system for using the service. For identification, the user has to type in his/her bank account number or any other user-unique identification. As the user is already enrolled in the system, a PIN is no longer needed.

2. In the next step, the user has to do a voice verification based on the information provided in the enrolment step (user's name+shared secrets).

3. After the user is successfully authenticated, he/she can use the service.

The combination of voice biometrics with shared secrets increases the level of convenience and still guarantees a certain level of security as the user has to pass an authentication step and has to know the shared secrets. The system thereby tests something the user is and something the user knows.

A further development to the $2^{nd}$ factor authentication procedures as explained above is an extension to the shared secret scenario. The embodiment explained above demands a secure authentication of the user in the enrolment phase. If the system cannot identify and authenticate the user in the enrolment, a potential intruder might, in principle, enrol in the system without being allowed to do so. In the example, this was checked by asking the bank account number and PIN. In other scenarios the secure authentication of the user based on an existing trust chain is more difficult. In such cases the following scenario, as illustrated in FIG. 5, is suitable, which solves the named problem in the first voice enrolment step by adding a web-based pre-registration.

Enrolment (Part 1)

1. The user is informed by the relevant authority that a voice biometrics system is introduced. Different from today's schemes, the user doesn't have to go through the complete voice authentication enrolment procedure in the beginning. The user only has to execute a first step of web-registration. The voice enrolment, which is needed to authenticate the user for any future transaction, will be done later on.

2. The user has to access an internal website, authenticating with his existing user name and PIN/password or an additional Registration PIN. After successful identification and authentication of the user, he/she will be asked to provide answers to a list of secret questions. These answers will be stored in the system and used later on to authenticate the user for voice enrolment and a password reset process.

Option 1: The secret answers have to be typed in.

Option 2: The secret answers have to be chosen out of a selection of answers offered to the user by the system (as exemplified in FIG. 5). ASR is not needed for voice enrolment; the user has to type in the right number of the answer using the keypad or touchpad of the phone.

3. After the user has provided the demanded information, the first registration step is completed. The user can now call e.g. the service any time he/she is in need of and finish the enrolment procedure with the voice enrolment steps.

Enrolment (Part 2)

4. If the user is in need of a new password or wants to use any other voice-authentication based service, he/she calls a given phone number and identifies with his/her user ID or any other given unique identity.

5. Based on the information given in the first step of the registration the user will be asked, either to speak (Option 1) or to type in (Option 2) the answers to a pre-registered challenge question. In Option 1, the spoken answers are being used to execute the voice profile evaluation and create a current speaker's voice model, whereas, if Option 2 is valid, the system will request that the user speaks pre-defined text pieces (numbers, names etc.), as explained further above in the first embodiment. In this latter case, the procedure takes somewhat more time and requires more activity from the user so that Option 1 should, at least in principle, be preferred from the point of view of user acceptance.

6. After enough data is collected to create a speaker's model, the user is successfully enrolled in the system.

7. After successful voice enrolment the user can immediately use the password reset or the other voice-authentication based service and does not have to call again—everything is handled in one call.

By following this challenge-response dialogue with a combination of shared secrets and voice biometrics, the system ensures a high level of convenience and security. On the one hand, the correctness of the given answers is checked, on the other hand a voice model is generated for the him/her to re-use the service.

Verification

1. For every further action, the user calls the system for using a voice service. For identification, the user has to type in his/her bank account number or any other unique user ID using DTMF.

2. In the next step, the user has to do a voice verification based on the information provided in the enrolment steps (user's name+shared secrets). As the user is already enrolled in the system he no longer needs to choose between different optional answers in the challenge—response procedure. He only needs to provide the right answer to the question asked by the system.

Figure 6A:
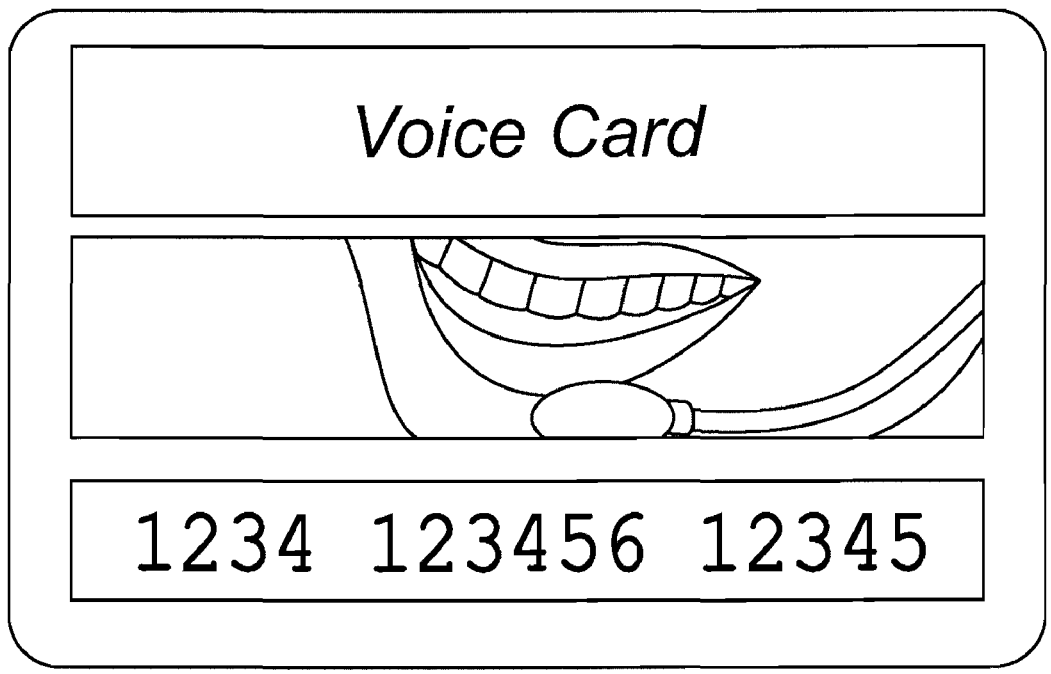
FIGS. 6A and 6B show both surfaces of an exemplary ID card to be used in a further embodiment of the present invention.
Figure 6B:
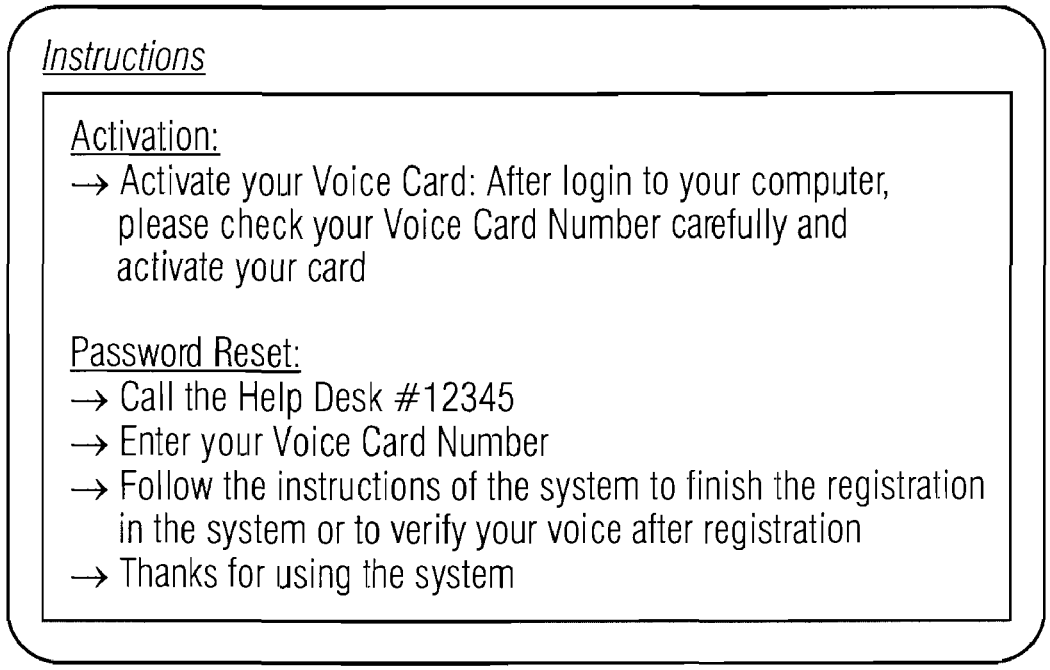

Now a further embodiment of the invention will be explained, referring to FIGS. 6A and 6B wherein a "Voice Card" is illustrated. The case of an employee of a firm will be discussed, who shall be authorized to use a voice profile based authentication system to gain success to a firm's data base system even after having forgotten a personal pass word. The "Voice Card" is distributed to every employee using the authentication system. The use of the card is based on an On-Demand principle; the card has to be activated before it is possible to use it.

On the front surface of the card (FIG. 6A) there is a "Voice Card" number, linked to a specific user in the system's database before the card is distributed among the users. There is no pre-linkage of any card to any user before it is sent to the service operator. Cards will be shipped as blank cards. After receiving the cards, existing user IDs (numeric, alpha-numeric, or even multiple user IDs) can be linked to a certain "Voice Card" number in the database.

On the back surface of the "Voice Card" (FIG. 6B) there is an instruction how the user should use this card for activating it, enrolling in the system and for authenticating himself should the situation arise.

An important advantage is that the user does not have to keep in mind his user-ID as it is linked in the database to the number shown ("system-specific ID") on the card. Especially in companies where multiple user IDs exist it is difficult for employees to keep in mind their user IDs. Compared to existing solutions, there are many further advantages: First of all, even without an access to a computer (which is not available in most situations when a user has forgotten his/her password) a user can reset his/her password, even without having registered his/her voice profile before. In prior solutions, a PIN code is sent via E-Mail to the user, which step is needed for voice enrolment. Having locked out of the system, the user cannot use the password reset service if he/she hasn't completed the voice enrolment. The problem many voice biometric solutions face is that it is hard to convince a user to do a voice enrolment before he/she actually needs the system. This can be solved by the on-demand enrolment procedure the "Voice Card" is based on.

Furthermore, in the case of "Voice Card" there is no visible linkage to a user and no user-specific data on the card. If the card gets lost or is stolen on the way, a possible fraudulent user cannot enrol in the system as the card can only be activated by that user who should receive the card. The activation will be based on an existing trust chain. This means that the card can only be activated after the user has logged on a certain service or system for which confidential user data are needed.

Now, important steps when using the "Voice Card" will be described.

1. Pre-Linkage of Card to User Data

Before the card is distributed among the users, each card (i.e. the system-specific ID displayed on the Voice Card) will be linked to users' details (e.g. user-ID) in the database. E.g. this means that card number 000000000000001 can be matched to user-ID aaa0001. There could be a linkage to multiple user-IDs as well. However, this linkage will only be in the database, there is no visible linkage of a certain "Voice Card" number to a specific user.

2. Activation of "Voice Card"

After the card has been delivered to a user, he/she has to activate it to make sure that the right user has received the right card. This activation procedure is based on an existing trust chain. E.g. after the user logs on to his/her computer he/she will be asked to activate his/her Voice Card. E.g. "You have received your voice card to do automated passwords resets based on voice authentication in the future. Your card number is: 000000000000001. If this is correct, please press "OK" to activate your card." For this purpose, by the authentication system a user-specific log in scheme is provided, i.e. a scheme which is determined for a specific user and accessible only by this user beforehand, on the basis of data which are pre-stored in a data base of the system.

Once the user has activated his/her card he/she can use the card for enrolment and verification of any password reset or other services. If the card is lost on the way or a wrong user has received a wrong number, no activation will be initiated and take place and therefore no voice enrolment and no password reset for a specific user is possible.

3. $1^{st}$ Time Usage: Voice Enrolment

After having activated the "Voice Card" the user can do the voice enrolment and password reset at any time he/she wants to. After calling a dedicated number, the user will be asked to enter his/her "Voice Card" number via DTMF, optionally via voice recognition. In the database the system-specific ID will be matched with the user ID. If the user hasn't enrolled his/her voice so far he/she will be asked to go through a challenge/response procedure for voice enrolment. In a first step the user will have to say his/her name, respectively repeat his/her name a couple of times. This step serves as a shared secret, as the name is not visible anywhere on the Voice Card and is not directly linkable for fraudsters. This means that the there is a 3-factor authentication once the user is enrolled.

Optionally, the "Voice Card" number (system-specific ID) will be matched to the user-ID in the database. The user-ID or any other user-specific information will be prompted on the telephone and the user has to repeat it for future usage a couple of times. This means that there is a 2-factor authentication once the user is enrolled.

For further voice enrolment the user will be asked to repeat a given word or number sequence multiple times until enough voice material is available to create a voice model.

After the voice profile has been stored on the server and linked to the user, the user can immediately reset a password for a chosen target system or use any other service.

4. Normal Usage

For normal usage the procedure is not different from the voice enrolment step, except for the fact that the voice samples don't have to be repeated a couple of times to create a voice print. First of all, the user has to type in his/her system-specific ID number using DTMF or via voice recognition. As a next step, the user has either to answer a shared secret question (e.g. his/her name) or repeat immediately the prompted information (e.g. user ID). In the following steps the user has to go through a challenge/response procedure to verify his/her voice. After successful voice verification the user is allowed to reset the password for a chosen target system or to use any other service.

The invention claimed is:

1. A process for authenticating a user, to control his remote access to a service, data base or data network using a computer system or electronic computing device, comprising: in an enrolment step, providing an identification and an initial voice sample by the user and analyzing the initial voice sample to obtain an initial user-specific voice profile and, in a later verification step, providing the identification and a current voice sample by the user and analyzing the current voice sample to obtain a current voice profile which is compared to the initial user-specific voice profile to generate an access control signal in response to a result of the comparison step, generating an additional user-dedicated authenticating means in a pre-enrolment period, using the additional user-dedicated authenticating means to authenticate the user in the enrolment step and/or in an access control step prior to and independent of the enrolment step, in a provisional or supplementary authentication procedure, wherein the additional authenticating means comprises a system-specific ID card, with the system-specific ID card displaying a unique system specific PIN or similar code, and the method further comprises system-internally linking the PIN or the code to the user and corresponding data of the user, and shipping the system-specific ID card as a blank card and activating the blank card upon request of the user and in response to an input of the system-specific PIN or similar code at a data or telecommunication terminal of the user.

2. The process according to claim 1, wherein the additional authentication means comprises (i) a PIN or similar code, and (ii) a user-specific set of information items, and the method further comprises the user initially inputting the user-specific set of information items in the pre-enrolment period.

3. The process according to claim 1, further comprising in the enrolment step, as well as in the verification step, requesting at least data elements of the additional authentication means from the user as a voice sample and spoken by the user to be made subject of the analysis of the initial voice sample, without involving a speech recognition step.

4. The process according to claim 1, further comprising in the enrolment step and/or an access control step prior to the enrolment step, requesting the user to input a PIN or similar code, optionally together with an additional user-specific information item, by speaking the PIN or similar code or via a data or telecommunication terminal keyboard, to identify and provisionally authenticate the user to obtain access to the enrolment step and/or the access control step.

5. The process according to claim 1, wherein the pre-enrolment period and the enrolment step are timed close to each other and the additional authenticating means are generated immediately in advance of the enrolment step.

6. The process according to claim 1, wherein the supplementary authentication procedure is connected to the enrolment step or the verification step, such that a combined authentication procedure with enhanced validity is created.

7. The process according to claim 1, further comprising transmitting data and voice samples input by the user to an authentication server via a telecommunication network.

8. The process of claim 1, further comprising informing the user of a result of the authentication steps only after the current voice sample is verified and the additional user-dedicated authenticating means is authenticated to limit feedback about success or failure of the authentication layers.

9. The process of claim 1, further comprising the additional user-dedicated authenticating means being provided as shared secret information in the initial voice sample by the user.

10. An arrangement for authenticating a user and controlling his remote access to a service, data base or data network, the arrangement comprising a user data and telecommunication terminal comprising a data input device and a speech input device for inputting a user's voice sample, an authentication server for processing data and voice samples input by the user and an at least temporary network connection of the user terminal to the authentication server, wherein the authentication server comprises a user identification recognition stage that recognizes a user identification, a voice profile generator, a voice processor to analyse user's voice samples to obtain a respective user-specific voice profile, a voice profile storage device for storing processed user's voice samples, and a voice profile comparator for comparing a current voice profile evaluated from a user's current voice sample with an initial voice profile stored in the voice profile storage device for obtaining a first authentication output based on a voice sample input by the user, and a user data processor, user data storage device for storing corresponding reference data of the user, and a user data comparator for comparing the referenced user data with data currently received from the user terminal for obtaining a second authentication output from data input by the user and an access control signal generator to generate an access control signal only after receiving the first and second authentication outputs, an ID Card generator for generating a physical system-specific ID card comprising a system-specific ID or similar code being unambiguously assigned to a user-specific set of information items, the user-specific set of information items including at least one of a user ID or an ID storage device for storing the system-specific ID or similar code in unambiguous assignment to the user-specific set of information items, wherein the ID storage device acts as a user data storage device and is connected to an input of the user data comparator, and a user card activating device for activating a previously generated and distributed system-specific ID card in response to an input of the system-specific ID or similar code via a data or telecommunication terminal.

11. The arrangement according to claim 10, wherein the access control signal generator is connected to an output of the voice profile comparator, for outputting the access control signal in response to the output of the voice profile comparator, wherein the authentication server further comprises a user data receiver for receiving data input at the user terminal via the data input device, the output of the user data comparator being connected to an auxiliary input of the access control signal generator, to enable the access control signal generator to output the access control signal in response to an input from the user data comparator.

12. The arrangement according to claim 10, further comprising:

a voice sample input instruction device for instructing the user to input a PIN or similar code or predetermined information items as the user's voice sample via the speech input device, and a text sample storage device for storing text samples which are subject of the user's voice sample input by the user, in response to instructions obtained from the authentication server, wherein the text sample storage device is connected to the voice processor to enable processing of the user's voice sample without an automatic speech recognition step.

13. The arrangement according to claim 12, wherein the voice sample input instruction device is adapted to output the instructions to the user in a frame of a user ID card or system-specific ID card comprising the text samples stored in the text sample storage or unique identifiers of the text samples.

14. The arrangement according to claim 12, wherein the voice sample input instruction device is adapted to output the instructions to the user in a frame of a system-user dialogue via a telecommunications or data network.

* * * * *